A. A. CANTON.
SPEEDOMETER.
APPLICATION FILED JUNE 27, 1914.

1,227,747.

Patented May 29, 1917.

Witnesses:
S. M. Baeder
K. Y. Lecare

Allen A. Canton Inventor
By his Attorney
Ivan E. A. Konigsberg.

UNITED STATES PATENT OFFICE.

ALLEN A. CANTON, OF NEW YORK, N. Y., ASSIGNOR TO THE DEVICE TESTING COMPANY, A CORPORATION OF CONNECTICUT.

SPEEDOMETER.

1,227,747.   Specification of Letters Patent.   Patented May 29, 1917.

Application filed June 27, 1914. Serial No. 847,669.

*To all whom it may concern:*

Be it known that I, ALLEN A. CANTON, a citizen of the United States of America, and a resident of the city, county, and State of New York, have invented certain new and useful Improvements in Speedometers, of which the following is a specification.

This invention relates to speedometers operated by electricity and the object of the invention is to provide a speedometer of novel, simple and practical construction. Other objects of the invention will appear hereinafter.

Accordingly this invention comprises such parts and elements arranged and combined as hereinafter set forth and as illustrated in the accompanying drawings in which—

Figure 1:
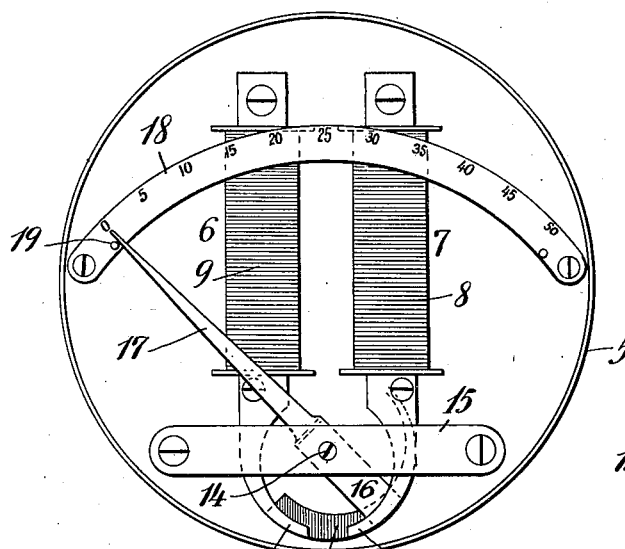
Figure 1 is a face view of a speedometer embodying my invention.

The reference numeral 5 denotes a casing for suitably containing and supporting the various parts. Fixed to the said casing are two electro-magnets 6 and 7 each of which is in the form of a horseshoe magnet wound with the coils 8, 8 and 9, 9 in a direction to produce poles 10, 10 and 11, 11. The two poles of each of the magnets 6 and 7 are of similar polarity and spaced a distance apart.

The two magnets 6 and 7 are so wound that the poles 10, 10 of the magnet 7 are of opposite polarity to the poles 11, 11 of the magnet 6 when current is supplied to the coils 8 and 9. The poles 10 and 11 are curved and approach each other as shown.

Figure 2:
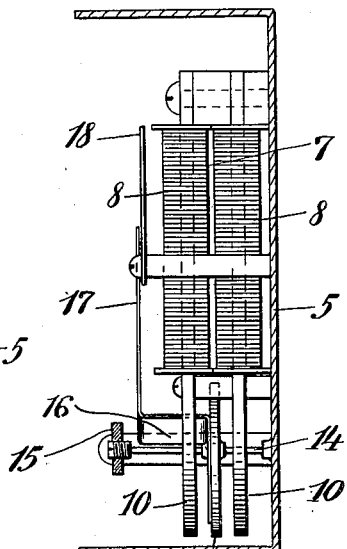
Fig. 2 is a side view with the casing in section.

13 is an armature of soft iron mounted to move on a spindle 14 pivoted in the casing and in a bridge piece 15 by means of an arm 16 which is prolonged to form a pointer 17 which moves over a scale 18. 19, 19 are stops for limiting the movement of the pointer and the armature 13, which latter moves within the magnetic field of the poles 10 and 11 of the respective magnets as shown in Fig. 2.

Figure 3:
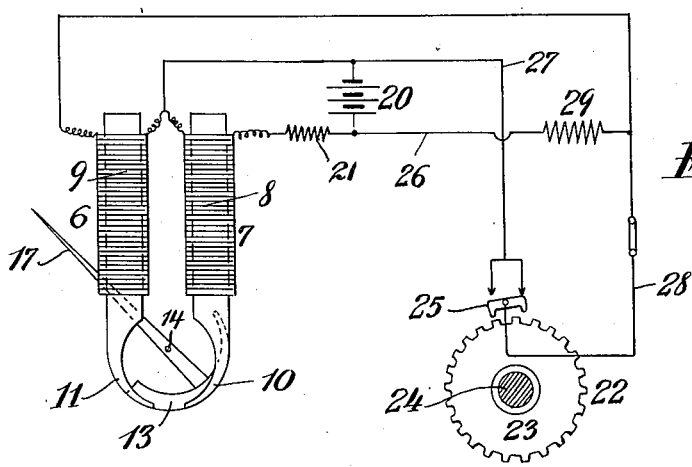
Fig. 3 is a wiring diagram.

Referring to Fig. 3 the coils 8 of the magnet 7 are connected across the battery 20. A resistance 21 serves to decrease the magnetic strength of the coils 8 with respect to the coils 9 so that the two magnets 6 and 7 are always at different magnetic strength.

The coils 9 of the magnet 6 are connected in shunt with the battery and with an interrupter 22 comprising a permanently magnetized toothed disk 23 secured to the shaft 24, the speed of which is to be measured, and an oscillating armature 25 which is permanently magnetized with a polarity opposite to that of the disk 23. When the shaft 24 is at rest, the magnet 6 is short circuited by way of the interrupter 22 and wires 26, 27 and 28 leading from the interrupter to the battery. 29 is a resistance to prevent short circuiting on the battery.

The coils 8 being supplied with a constant electric current energizes the magnet 7 which attracts the armature 13 and moves it into the position shown in Fig. 1 where the pointer is at zero.

When the shaft 24 commences to rotate, the interrupter armature 25 is oscillated, as will be understood, permitting current impulses to pass through the coils 9 which then energize the magnet 6. The faster the shaft 24 moves, the greater is the frequency of current impulses passing through the coils 9 and whereby the magnetic strength of the poles 11 is increased in proportion to the frequency of the impulses, it being understood that the parts are so timed and arranged that the periods of impulses are greater than those of interruption. Consequently the armature is attracted by the poles 11 and moves on its spindle 14 proportionate to the frequency of the current impulses. The movement of the armature 13 is indicated by the pointer 17 on the scale 18.

I have found this speedometer to work very accurately in actual practice. The construction of the electromagnets insures that the armature 13 is completely within the influence of their magnetic field and responds instantly to the difference in magnetic strength of the two magnets 6 and 7.

The invention is susceptible of changes and the detailed construction may be varied within the scope of the appended claims without departing from the principle of the invention.

I claim:—

1. A speedometer comprising a pair of electromagnets of different magnetic strength, means for supplying a constant electric current to the one electromagnet, means for supplying an intermittent electric current to the other electromagnet to increase its magnetic strength, an armature mounted to move in response to the difference in electric strength of the said two electromagnets and means for indicating the movement of the said armature.

2. A speedometer comprising a pair of electromagnets of different magnetic strength, each of said electromagnets being in the form of a horseshoe magnet having poles of equal polarity and spaced a distance apart, an armature mounted to move within the magnetic field of the two electromagnets and between the poles of each one of the same and in response to the difference in magnetic strength of the said two electromagnets, means for indicating the movement of the said armature, means for limiting the movement thereof and means for supplying electric current to the two magnets.

3. A speedometer comprising two electromagnets of opposite polarity and of different magnetic strength, each of said magnets being a horseshoe magnet with poles of equal polarity, an armature mounted to oscillate within the magnetic field of the said two electromagnets and between the poles of each one of them, a pointer secured to said armature, a scale for said pointer and means for supplying electric current to the said two electromagnets.

Signed at New York, N. Y., this 26th day of June, 1914.

ALLEN A. CANTON.

Witnesses:
 WALTER S. MORTON,
 IVAN KONIGSBERG.